S. T. ALLEN.
TRACTOR WHEEL.
APPLICATION FILED OCT. 27, 1919.
1,368,535.
Patented Feb. 15, 1921.
Fig.1.
Fig.2.
Fig.3.
Fig.4.
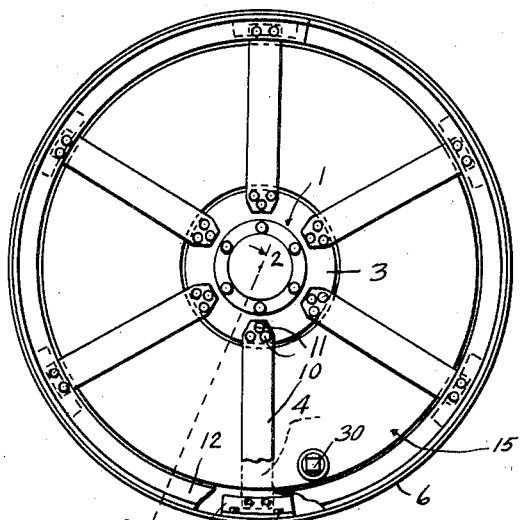
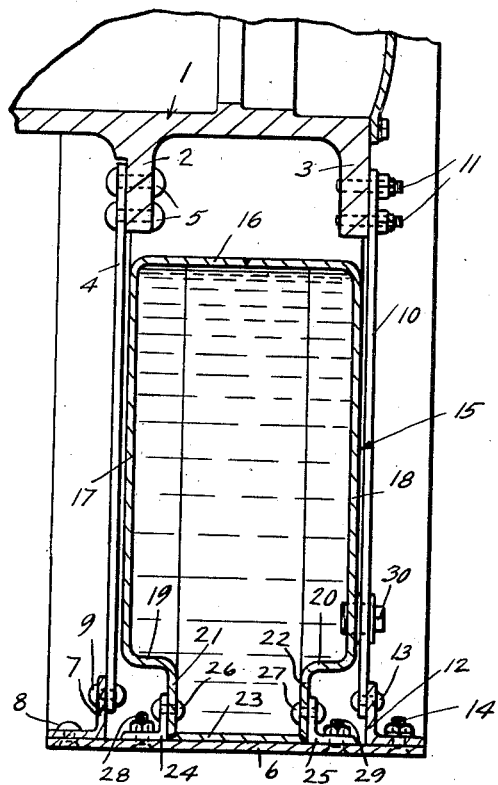
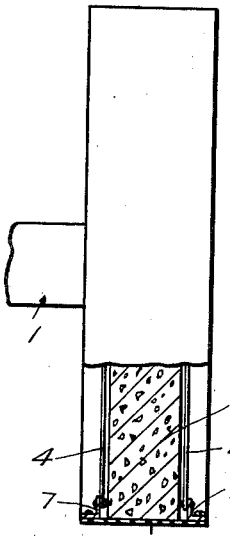
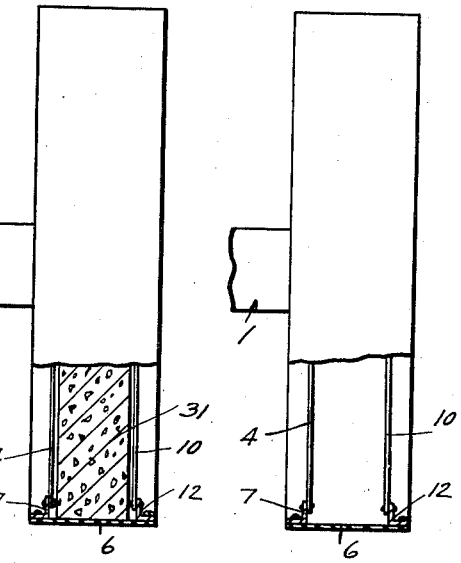
INVENTOR.
S. T. Allen,
BY Hazard & Miller
ATTORNEYS.

UNITED STATES PATENT OFFICE.

SHERMAN T. ALLEN, OF PASADENA, CALIFORNIA.

TRACTOR-WHEEL.

1,368,535.  Specification of Letters Patent.  Patented Feb. 15, 1921.

Application filed October 27, 1919. Serial No. 333,598.

*To all whom it may concern:*

Be it known that I, SHERMAN T. ALLEN, a citizen of the United States, residing at Pasadena, in the county of Los Angeles and State of California, have invented new and useful Improvements in Tractor-Wheels, of which the following is a specification.

My invention relates to tractor wheels and consists of the novel features herein shown, described and claimed.

My object is to provide tractors with driving wheels, the traction force of which can be increased or decreased according to the demand by inserting or removing ballast from within the rims of the wheels.

Figure 1 is a side elevation of a tractor wheel embodying the principles of my invention.

Fig. 2 is an enlarged sectional detail on the line 2—2 of Fig. 1 and looking in the direction indicated by the arrows.

Fig. 3 is an edge view of the wheel shown in Fig. 1, parts being broken away and shown in section to show a modified form of ballast.

Fig. 4 is a view analogous to Fig. 3 and showing the ballast removed.

The wheel hub 1 has parallel annular flanges 2 and 3 extending outwardly. Inner spokes 4 are placed against the inner flange 2 and secured in place by rivets 5. The flat band rim 6 forms the tread of the wheel. Sections of angle iron 7 are inserted into the rim 6 and secured in place by rivets 8 and the angle irons are secured to the outer ends of the spokes 4 by rivets 9. Outer spokes 10 fit against the outer face of the outer flange 3 and are secured in place by stud bolts 11. Angle iron sections 12 are placed against the outer ends of the outer spokes 10 and are secured in place by rivets 13. The angle iron sections 12 are removably secured to the rim 6 by bolts 14. The wheel thus constructed is comparatively light and is suitable for traveling on roads and streets.

When it is desired to ballast the wheel the bolts 11 and 14 are removed, the spokes 10 removed and the ballast inserted between the rim 6 and the hub 1 and between the positions occupied by the spokes, then the spokes 10 are reapplied.

In Fig. 2 the annular ballast tank 15 is constructed of sheet metal and has an annular inner wall 16, annular side walls 17 and 18 extending outwardly from the edges of the inner wall 16, annular outer walls 19 and 20 extending toward each other from the outer edges of the walls 17 and 18 concentric to the wall 16, annular side walls 21 and 22 extending outwardly from the inner edges of the walls 19 and 20, and the rim wall 23 connecting the outer edges of the side walls 21 and 22. The rim wall 23 fits closely within the rim 6. Angle iron sections 24 and 25 are secured to the side walls 21 and 22 by rivets 26 and 27 and these angle iron sections 24 and 25 are removably secured to the rim 6 by bolts 28 and 29.

The tank 15 may be filled to any desired extent with water or the like by removing the plug 30 in the side wall 18.

In the modification shown in Fig. 3 the ballast 31 fitting within the rim 6 between the spokes 4 and 10 is a casting formed of concrete or the like. In Fig. 4 I have shown the ballast removed.

Various changes may be made without departing from the spirit of my invention as claimed.

I claim:

A tractor wheel comprising a hub, a rim, inner spokes connecting the rim to the hub, a ballast tank removably mounted between the rim and the hub, and outer spokes removably mounted outside of the ballast tank and connecting the rim to the hub.

In testimony whereof I have signed my name to this specification.

SHERMAN T. ALLEN.